(12) United States Patent
Phelps, Sr.

(10) Patent No.: US 9,927,148 B1
(45) Date of Patent: Mar. 27, 2018

(54) SYSTEM AND METHOD FOR GENERATING POWER USING A CHEMICAL LOOPING COMBUSTION REACTION

(71) Applicant: Calvin E. Phelps, Sr., Easton, PA (US)

(72) Inventor: Calvin E. Phelps, Sr., Easton, PA (US)

( * ) Notice: Subject to any disclaimer, the term of this patent is extended or adjusted under 35 U.S.C. 154(b) by 396 days.

(21) Appl. No.: 14/596,632

(22) Filed: Jan. 14, 2015

Related U.S. Application Data

(60) Provisional application No. 61/928,196, filed on Jan. 16, 2014.

(51) Int. Cl.
  *F24J 1/00* (2006.01)
  *C01G 49/02* (2006.01)

(52) U.S. Cl.
  CPC .............. *F24J 1/00* (2013.01); *C01G 49/02* (2013.01); *F23C 2900/99008* (2013.01)

(58) Field of Classification Search
  CPC ... F24J 1/00; F23K 3/00; Y02E 20/346; F23C 2900/99008; C01G 49/0018; C01G 49/02; C01G 49/04; C01G 49/06
  See application file for complete search history.

(56) References Cited

U.S. PATENT DOCUMENTS

2013/0022931 A1   1/2013   Tseng

*Primary Examiner* — Alfred Basichas
(74) *Attorney, Agent, or Firm* — LaMorte & Associates, P.C.

(57) ABSTRACT

A system and method for generating excess heat through the process of chemical looping combustion. A volume of a first metal oxide is provided. The first metal oxide is reacted with an acid solution to create a reaction solution that contains metal hydroxide. The metal hydroxide is precipitated from the reaction solution. This produces particles of metal hydroxide. The particles of metal hydroxide are separated from the reaction solution, which is regenerated. The particles of metal hydroxide are then reacted with heat to produce a less complex second metal oxide. The second metal oxide is reacted with oxygen in a confined chamber. As the second metal oxide oxidizes, it releases heat. The heat released is greater than the heat needed to operate the system. The heat can be utilized to produce steam or otherwise meet the energy needs of the operator.

19 Claims, 3 Drawing Sheets

US 9,927,148 B1

SYSTEM AND METHOD FOR GENERATING POWER USING A CHEMICAL LOOPING COMBUSTION REACTION

RELATED APPLICATIONS

This application claims priority of U.S. Provisional Patent Application No. 61/928,196, filed Jan. 16, 2014.

BACKGROUND OF THE INVENTION

1. Field of the Invention

In general, the present invention relates to systems and method of creating and sustaining a chemical looping combustion reaction. More particularly, the present invention relates to systems and methods that utilize chemical looping combustion reactions to generate heat for secondary uses.

2. Prior Art Description

Chemical looping combustion is the name given to a family of cyclical chemical reactions where a metal oxide is first reduced with heat into a metal or a lower order metal oxide. The metal is later reacted back into the metal oxide to produce heat. Typically, chemical looping combustion reactions employ a dual circulating fluidized bed process where a metal oxide is employed as a first bed material. The metal oxide provides the oxygen for combustion in a fuel reactor. The reduced metal is then transferred to an air reactor where it is re-oxidized back into a metal oxide. The metal oxide is reintroduced back to the fuel reactor completing the loop.

The reduction of a metal oxide into a metal is an endothermic reaction that requires heat. The oxidation of metal into a metal oxide is an exothermic reaction that releases heat. In a well prepared chemical looping combustion reaction, the heat absorbed is generally equivalent to the heat released. Thus, traditional chemical looping combination reactions are energy neutral and are not useful in producing heat for power. Rather, chemical looping combustion cycles are typically used as tools of chemistry to produce or absorb targeted chemicals during the cycling chemical reactions. The gas produced or absorbed is often carbon dioxide or hydrogen. Such prior art chemical looping combustion systems are exemplified by U.S. Patent Application Pub. No. 2013/0022931 to Tseng.

Although the ability to absorb or produce certain gases is useful, it limits chemical looping combustion systems to very specific industrial applications. A need therefore exists for a system and method of producing a chemical looping combustion system, where the heat released by the system is significantly greater than the heat required to operate the system. In this manner, a chemical looping combustion system can be used as a heat source that produces heat in a highly efficient manner. The heat produced can then be used to produce power and otherwise provide for the energy needs of the operator.

This need is met by the present invention as described and claimed below.

SUMMARY OF THE INVENTION

The present invention is a system and method for generating excess heat through the process of chemical looping combustion. A volume of a first metal oxide is provided. The first metal oxide is reacted with an acid solution to create a reaction solution that contains metal hydroxide. The metal hydroxide is precipitated from the reaction solution. This produces particles of metal hydroxide.

The particles of metal hydroxide are separated from the reaction solution. The particles of metal hydroxide are then reacted with heat to produce a less complex second metal oxide. The second metal oxide is reacted with oxygen in a confined chamber. As the second metal oxide oxidizes, it releases heat. The heat released is greater than the heat needed to operate the system. The heat can be utilized to produce steam or otherwise meet the energy needs of the operator.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention chemical looping combustion system can be embodied in many ways, the embodiment illustrated shows the system operating using a ferrous oxide-to-ferric oxide ($FeO$—$Fe_2O_3$) cycle. Other metal oxides can be used. This embodiment is selected in order to set forth one of the best modes contemplated for the invention. The illustrated embodiment, however, is merely exemplary and should not be considered a limitation when interpreting the scope of the appended claims.

Figure 1:
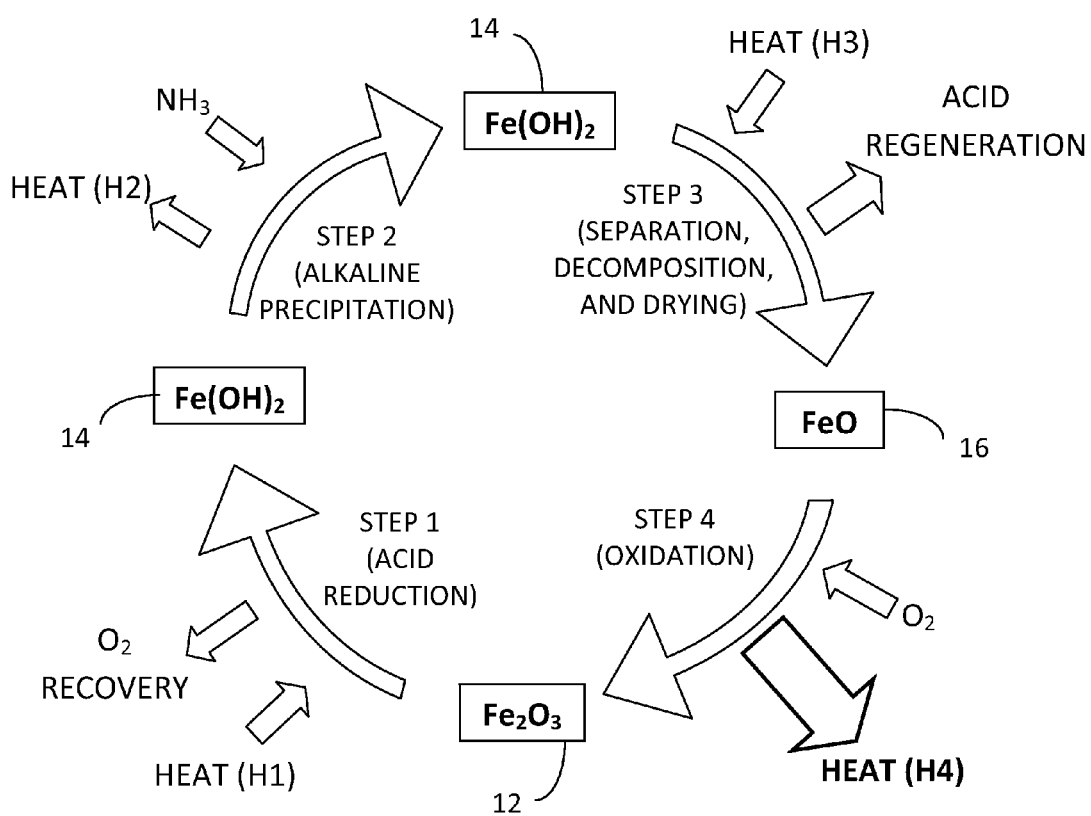
FIG. 1 is a diagram showing the chemical looping combustion cycle utilized by the present invention system and method.

Referring to FIG. 1, an overview of the chemical looping combustion cycle 10 produced by the present invention system is illustrated. The chemical looping combustion cycle 10 is a four-step cycle. Processes used within the four-step cycle are unique to the present invention system and are later described in great detail. In the exemplary embodiment illustrated, ferric oxide [$Fe_2O_3$] 12 is reacted in Step 1 with an acid to produce ferrous hydroxide [$Fe(OH)_2$] 14 in solution. Reacting ferric oxide [$Fe_2O_3$] 12 requires energy, in the form of Heat (H1), to sustain the chemical reactions and oxygen is recovered. In Step 2, the ferrous hydroxide [$Fe(OH)_2$] 14 is reacted in an exothermic reaction releasing Heat (H2) and precipitating it from solution by reacting it with a volatile base. In Step 3, the ferrous hydroxide [$Fe(OH)_2$] 14 is reacted in an endothermic decomposition and dewatering reaction to produce dry ferrous oxide [$FeO$] 16 particles. Reacting ferrous hydroxide [$Fe(OH)_2$] 14 requires Heat (H3), to sustain the chemical reactions. In Step 4, the ferrous oxide [$FeO$] 16 is oxidized to produce ferric oxide [$Fe_2O_3$] 12. This is an exothermic reaction that produces Heat H4. Due to the unique methodology practiced in Step 1, Step 2, and Step 3 of the cycle, the input heat requirements (H1+H3) minus the heat recovered in Step 2 (H2) consume only about twenty percent of the Heat (H4) produced during Step 4. Consequently, about eighty percent of the heat is excess heat that can be taken from the system and used for other purposes, such as generating power. The chemical looping combustion cycle 10 is therefore no longer energy neutral. Rather, it now can be operated as a heat engine that has a high efficiency and relatively low cost of operation.

Figure 2:
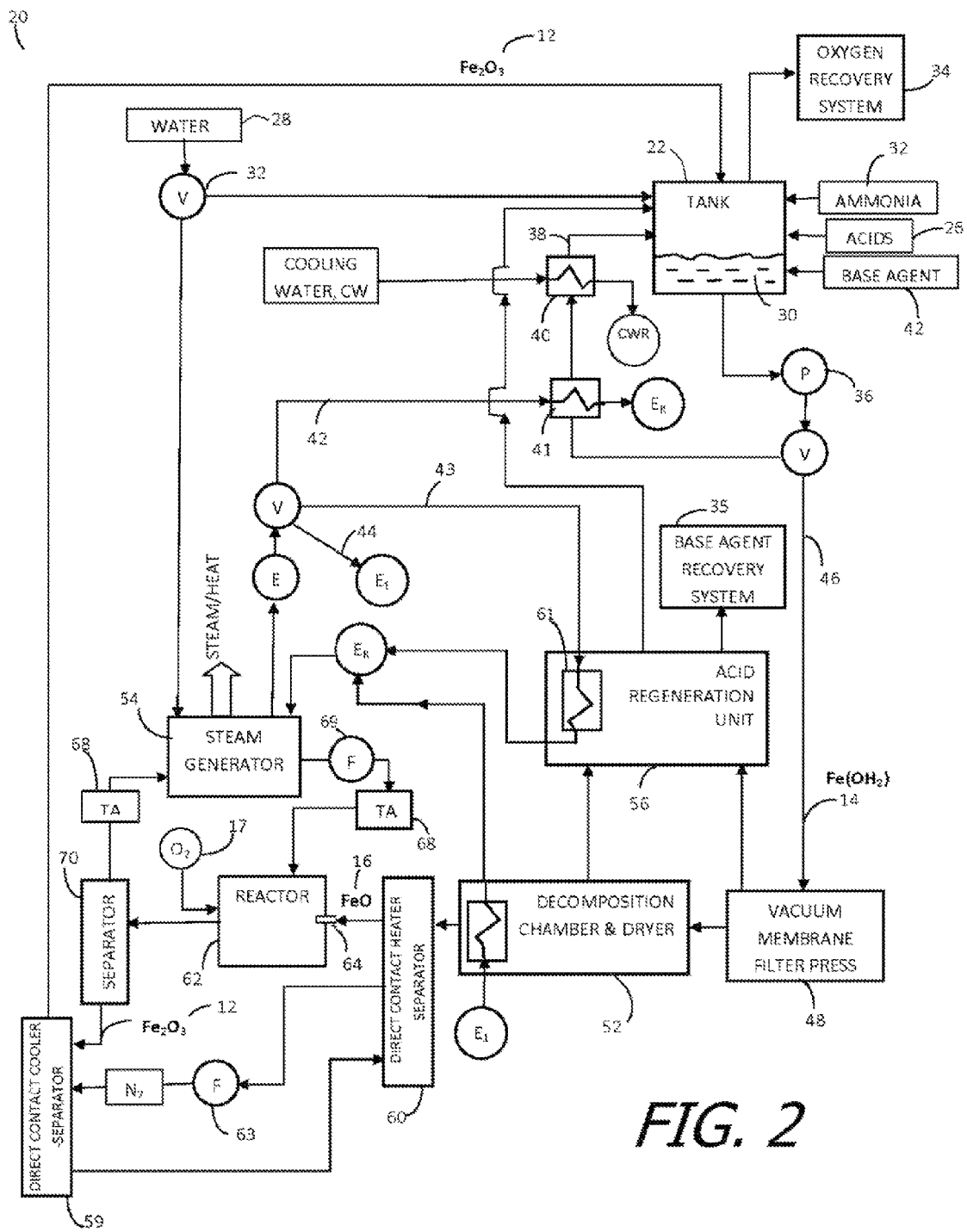
FIG. 2 is a schematic showing the major components of the chemical looping combustion system in accordance with the present invention.
Figure 3:
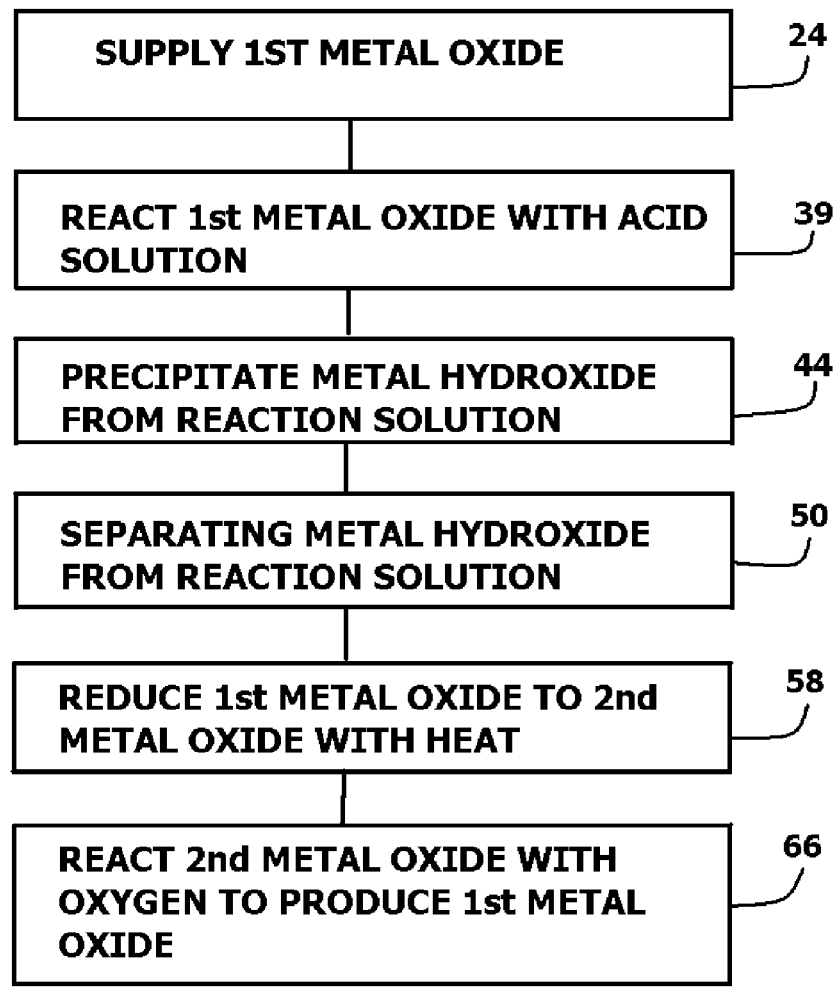
FIG. 3 is a block diagram illustrating the methodology of the chemical looping combustion system.

Referring to FIG. 2 in conjunction with FIG. 3, the primary components and operating methodology of the chemical looping combustion system 20 are shown. The system 20 includes a tank 22. An initial volume of a first metal oxide is fed into the tank 22. See Block 24. The exemplary first metal oxide is ferric oxide [$Fe_2O_3$] 12. The tank 22 is prefilled with a reaction solution 30. Initially the reaction solution 30 is an acid solution. Initially, the reaction solution 30 is a mixture of acids 26 with water 28. The water 28 is both deionized and deoxygenated. The preferred acid solution is up to 77% citric acid that is heated to a temperature of 190° F. A secondary acid, such as erythorbic acid is added to the tank 22. The secondary acid is preferably added to a solubility of about 60% in the water 28. The erythorbic acid reduces ferric to ferrous iron, accelerates dissolution of ferric iron, and stabilizes ferrous iron in solution. The primary mechanism of iron oxide dissolution in organic acid is by two-stage reductive dissolution. The first stage is the induction period of slow ferric iron dissolution to generate ferrous ions. The second stage is the autocatalytic period, which requires ferrous ions to promote rapid dissolution of ferric oxide. When ferric oxide is suspended in acid solution, its surface supports electrical charges to which citric ligands adsorb, promoting protonation and weakening of the oxide structure. The ligands transfer electrons to ferric iron and reduce it to ferrous ions (dissolution), which release into solution to form ferrous citrate ligands and start the accelerated autocatalytic period of dissolution.

In this second stage, ferrous citrate ligands adsorb to ferric oxide surfaces, accelerating electron exchanges to dissolve ferric iron for release into solution. The erythorbic acid reduces ferric to ferrous ions, stabilizes them in solution, and makes them available to accelerate dissolution. Adding a small amount of ferrous ions to the solution shortens the induction period and accelerates dissolution of the ferric oxide ($Fe_2O_3$).

The initial reaction solution 30 in the tank 22 is concentrated up to the solubility limit of citric acid in water (about 77% CA w/w at 190° F.). The high acid concentration, along with introduction of erythorbic acid, allows flexibility in the quantity of ferrous iron to be chelated by the citric acid. For example, choosing to chelate twenty-five percent of the iron with citric acid and stabilizing seventy-five with erythorbic acid produces rapid dissolution of ferric oxide [$Fe_2O_3$] 12. Additional benefits from use of erythorbic acid include its ability to hold a low pH for dissolution and its ability to scavenge oxygen.

Ammonia 32 is preferably added to the tank 22, wherein the initial reaction solution 30 within the tank 22 has a pH level of approximately 3.5. Ammonia 32 or a volatile base may be introduced to adjust the pH to about 3.5 for optimum dissolution.

The reaction solution 30 within the tank 22 is agitated to dissolve the ferric oxide [$Fe_2O_3$] 12. The tank 22 is coupled to a pump 36 and various plumbing loops. After the ferric oxide [$Fe_2O_3$] 12 is dissolved, the temperature of the reaction solution 30 in the tank 22 is raised to 212° F. through a loop 38 from an indirect heater 41, which is supplied heat extracted (E) from steam generator 54 through loop 42 with return to a steam generator 54 ($E_R$). Oxygen produced in the tank 22 is vented and recovered by an oxygen recovery system 34. The result is an acidic reaction solution 30 that contains a metal hydroxide derived from the initial metal oxide. See Block 39 on FIG. 3.

After equilibrium is reached, the reaction solution 30 is cooled by an indirect heater 40. A plumbing loop 38 circulates the reaction solution 30 through a water cooled heat exchanger 40, wherein the reaction solution 30 is cooled to about 170° F. The cooling water, CW can be extracted from an upstream point in the piping that supplies low temperature water to the plant low pressure heaters and then returned, CWR downstream of this extraction point. This feature can be integrated with the plant cycle heat balance for steam generator 54 that is heated by the chemical looping combustion system 20.

A base agent 42 is added to the reaction solution 30 in the tank 22 to neutralize the acids and raise the pH. As the pH within the tank 22 rises over 8, ferrous hydroxide [$Fe(OH)_2$] 14 starts to precipitate out of solution. This condition is maintained until equilibrium is achieved and the precipitation stops. The end result is a reaction solution 30 with an alkaline pH that contains precipitated particles of metal hydroxide. See Block 44 on FIG. 3.

Using plumbing loop 46, the reaction solution 30 with the precipitated ferrous hydroxide [$Fe(OH)_2$] 14 is pumped to a vacuum membrane filter press 48. Some of the ferrous hydroxide [$Fe(OH)_2$] 14 precipitate is left in the tank 22 to serve as a catalyst during the next dissolution cycle.

Most of the ferrous hydroxide [$Fe(OH)_2$] 14 precipitate is received within the vacuum membrane filter press 48. Within the vacuum membrane filter press 48, the ferrous hydroxide [$Fe(OH)_2$] 14 precipitate is separated from the remaining fluids in an inert atmosphere. The preferred atmosphere is nitrogen. The vacuum membrane filter press 48 achieves approximately a 98% solids separation. The result is particles of ferrous hydroxide [$Fe(OH)_2$] 14 that are nearly dry. See Block 50 on FIG. 3.

A decomposition and dryer chamber 52 receives the filtered output of the vacuum membrane filter press 48. The chamber 52 is heated indirectly with steam produced by a steam generator 54 through loop 44 that is heated by the chemical looping combustion system 20. Within the chamber 52 is a steam atmosphere that is devoid of free oxygen. The fluids separated from the solids by the vacuum membrane filter press 48 are recovered. The recovered liquids are subjected to an acid regeneration unit 56 that produces acids used in the initial acid solution within the tank 22. Heat is supplied to unit 56 by an indirect heater 61, which is supplied heat through loop 43 from combustion system 20. Base agent $NH_3$ is released to base agent recovery system 35 when the alkaline solution is heated above its solubility limit, and the solution converts to an acid solution and is now regenerated.

The chamber 52 is maintained at an operating temperature of approximately 300° F. In the chamber 52, the ferric hydroxide [$Fe(OH)_2$] 14 is thermally reduced into ferrous oxide [FeO] 16 and water vapor [$H_2O$]. See Block 58 on FIG. 3. The dried ferrous oxide [FeO] 16 is then fed into a direct contact cyclone heater 60. In the cyclone heater 60, the particles of ferrous oxide [FeO] 16 are pre-heated by recovered sensible heat from ferrous hydroxide [$Fe_2O_3$] leaving separator 70. Heat recovery and exchange is accomplished by circulating nitrogen ($N_2$) with fan 63 in a closed loop through direct contact cyclone cooler 59 and then through direct contact cyclone heater 60, returning to fan 63 to complete the loop.

A reactor 62 is provided. Feed nozzles 64 are used to inject the dried ferrous oxide [FeO] 16 into the reactor 62 from the direct contact cyclone heater 60. Within the reactor 62, an operating temperature of approximately 1850° F. is maintained by FeO 16 feed rate and recirculated tempering air 68. Using the recirculated tempering air 68 is another unique feature in combustion system 20 and in conservation of heat input for controlling FeO 16 injection rate, mixing with oxygen 17, adiabatic temperature, residence time, and for heat transfer to steam generator 54. Combustion system 20 does not reject heat from an exhaust stack as in conventional combustion systems.

Oxygen 17 is injected into the reactor 62. The oxygen, in part, can be the oxygen recovered by the oxygen recovery system 34 from the tank 22 during the dissolution of the ferric oxide [$Fe_2O_3$] 12. Within the reactor 62, the injected ferrous oxide [FeO] 16 oxidizes rapidly to become ferric oxide [$Fe_2O_3$] 12. See Block 66 on FIG. 3. The reaction is highly exothermic and produces a large amount of heat, as is shown in Equation 1 below.

$$FeO + \tfrac{1}{4}O_2 \rightarrow \tfrac{1}{2}Fe_2O_3 + \text{Heat}(Q) \qquad \text{Equation 1}$$

Residence time within the reactor 62 is controlled by tempering air 68 that is introduced into the bottom of the reactor 62. The ferric oxide [$Fe_2O_3$] 12 that is produced in the reactor 62 is discharged into a cyclone separator 70. The cyclone separator 70 separates the ferric oxide [$Fe_2O_3$] 12 from the tempering air 68. The particles of ferric oxide [$Fe_2O_3$] 12 are then ready for use in the tank 22 and the chemical looping combustion system 20 can be repeated.

Although the chemical looping reaction system 20 is an efficient looped system, it is not a closed loop system. The acids needed to dissolve the ferric oxide [$Fe_2O_3$] 12 must be replenished each time ferric oxide [$Fe_2O_3$] 12 is added to the tank 22. Although some new acids must be added in each cycle, much of the needed acids can be regenerated from the liquid wastes recovered from the vacuum membrane filter press 48 and the chamber 52.

To regenerate the needed acid, the acid regeneration unit 56 collects the fluids and condenses the vapors released by the vacuum membrane filter press 48 and the chamber 52. The collected liquid is alkaline. The collected liquid is heated indirectly with heated water to approximately 212° F. in heater 61 through loop 43, which is extracted from the steam generator 54 and returned to steam generator 54. The ammonium citrate carboxylate salts decompose near this temperature and release ammonia ($NH_3$) to solution. Other ammonium ions ($NH_4^+$) in solution also convert to ammonia ($NH_3$). The $NH_3$ is vented to its recovery system, resulting in a lowering of solution pH to about 3.5. The solution is now acid and can be mixed into the tank 22. The released ammonia can also be collected and reused.

The chemical looping combustion system 20 produces more heat than is required to maintain its operation. Approximately twenty percent of the heat generated is used in operations. This leaves approximately eighty percent of the heat free for other uses. The materials consumed by the chemical looping combustion system 20 include acids, bases, water, nitrogen gas and small replenishing amounts of ferric oxide [$Fe_2O_3$]. Regardless, the operational costs of running the chemical looping combustion system 20 are less than the costs of running a fossil fuel plant that produces the same amount of usable heat. Furthermore, the chemical looping combustion system 20 does not produce any greenhouse gases, such as carbon dioxide.

It will be understood that the embodiment of the present invention that is illustrated and described is merely exemplary and that a person skilled in the art can make many variations to that embodiment. All such embodiments are intended to be included within the scope of the present invention as defined by the claims.

What is claimed is:

1. A method for generating heat, comprising the steps of:
providing a volume of a first metal oxide;
reacting said first metal oxide with a citric acid solution and an erythorbic acid solution using a two-stage reductive dissolution, wherein said first metal oxide is first mixed with said citric acid to generate metal ions and said erythorbic acid is later added, wherein said erythorbic acid and said metal ions promote dissolution of said first metal oxide to create a reaction solution that contains a metal hydroxide;
precipitating said metal hydroxide from said reaction solution to produce particles of metal hydroxide;
separating said particles of metal hydroxide from said reaction solution;
heating said particles of metal hydroxide to reduce said first metal oxide to a second metal oxide; and
reacting said second metal oxide with oxygen to produce said first metal oxide and heat.

2. The method according to claim 1, further including the step of using at least some of said heat to produce steam from water.

3. The method according to claim 1, wherein said step of reacting said first metal oxide with said citric acid solution and said erythorbic acid solution occurs in an inert atmosphere that is devoid of oxygen.

4. The method according to claim 1, wherein said step of precipitating said metal hydroxide from said reaction solution includes the substeps of changing said reaction solution from an acid pH to an alkaline pH, and cooling said reaction solution.

5. The method according to claim 1, wherein said step of separating said particles of metal hydroxide from said reaction solution includes passing said reaction solution through a vacuum membrane filter press.

6. The method according to claim 2, wherein said step of heating said particles of metal hydroxide to produce a second metal oxide includes the substep of heating said particles of metal hydroxide in a decomposition and dryer chamber heated, that is at least in part, by said steam.

7. The method according to claim 6, wherein said step of heating said particles of metal hydroxide to produce a second metal oxide includes the substep of placing said particles of metal hydroxide in a cyclone heater.

8. The method according to claim 7, wherein said step of reacting said second metal oxide with oxygen includes injecting said second metal oxide into a reaction chamber with both air and oxygen.

9. The method according to claim 1 wherein said first metal oxide and said second metal oxide are both iron oxides.

10. The method according to claim 1, further including the step of regenerating said reaction solution into an acid solution after being separated from said metal hydroxide.

11. A method for generating heat, comprising the steps of:
providing a volume of ferric oxide;
reacting said ferric oxide with a citric acid solution and an erythorbic acid solution using a two-stage reductive dissolution, wherein said ferric oxide is first mixed with said citric acid to generate ferric ions and said erythorbic acid is later added, wherein said erythorbic acid reduced said ferric ions to ferrous ions and said ferrous ions accelerates dissolution of said ferric oxide to create a reaction solution that contains ferrous hydroxide;
precipitating said ferrous hydroxide from said solution to produce particles of ferrous hydroxide;

separating said particles of ferrous hydroxide from said reaction solution;

heating said particles of ferrous hydroxide to reduce said particles of ferrous hydroxide to said ferrous oxide and $H_2O$; and separating said ferrous oxide from said $H_2O$; and reacting said ferrous oxide with oxygen to produce said ferric oxide and heat.

12. The method according to claim 11, further including the step of using at least some of said heat to produce steam from water.

13. The method according to claim 11, wherein said step of reacting said ferric oxide with said citric acid solution and an erythorbic acid solution occurs in an inert atmosphere that is devoid of oxygen.

14. The method according to claim 11, wherein said step of precipitating said ferrous hydroxide from said reaction solution includes the substeps of changing said reaction solution from an acid pH to an alkaline pH, and cooling said reaction solution.

15. The method according to claim 11, wherein said step of separating said particles of ferrous hydroxide from said reaction solution includes passing said reaction solution through a vacuum membrane filter press.

16. The method according to claim 12, wherein said step of heating said particles of ferrous hydroxide includes the substep of heating said particles of ferrous hydroxide in a decomposition and dryer chamber that is heated, at least in part, by said steam.

17. The method according to claim 16, wherein said step of heating said particles of ferrous hydroxide includes the substep of placing said particles of ferrous hydroxide in a cyclone heater.

18. The method according to claim 17, wherein said step of reacting said ferrous oxide with oxygen includes injecting said ferrous oxide into a heated reaction chamber with both air and oxygen.

19. The method according to claim 11, further including the step of regenerating said reaction solution into an acid solution after being separated from said particle of ferrous hydroxide.

* * * * *